United States Patent

[11] 3,565,093

[72] Inventor Richard W. Hatch, Jr.
 Foxboro, Mass.
[21] Appl. No. 807,352
[22] Filed Mar. 14, 1969
[45] Patented Feb. 23, 1971
[73] Assignee The Foxboro Company
 Foxboro, Mass.

[54] RATIOED PNEUMATIC REPEATER
 2 Claims, 4 Drawing Figs.
[52] U.S. Cl. .................................... 137/85, 137/403
[51] Int. Cl. .................................... F15b 5/00, G05d 16/00
[50] Field of Search .......................... 137/85, 86, 82, 84

[56] References Cited
 UNITED STATES PATENTS
| 2,476,104 | 7/1949 | Mason | 137/86X |
| 2,441,405 | 5/1948 | Fitch | 137/82 |
| 2,461,026 | 2/1949 | Bilyen | 137/85 |
| 2,781,770 | 2/1957 | Sutton | 137/85 |
| 2,964,051 | 12/1960 | Garnett | 137/85 |
| 3,003,475 | 10/1961 | Rouvalis | 137/85X |
| 3,417,773 | 12/1968 | Hatch | 137/85 |
| 3,426,788 | 2/1969 | Bassett | 137/403X |
| 3,252,471 | 5/1966 | Olson | 137/85 |

Primary Examiner—Alan Cohan
Attorney—Lawrence H. Poeton

ABSTRACT: A diaphragm ratio capsule separates a recess within a housing into a signal pressure chamber and a repeating pressure chamber; for the condition of signal pressure lower than repeating pressure, the diaphragm ratio capsule is moved away from an exhaust valve permitting pressure in the repeating chamber to vent to atmosphere; for the condition of signal pressure higher than repeating pressure the diaphragm ratio capsule forces the exhaust valve to move which in turn unseats a supply valve permitting the supply pressure to enter the repeating pressure chamber; thus the repeating chamber pressure follows the pressure of the signal chamber; the capsule has two different sized diaphragms for ratio function, bias pressure may be applied between the diaphragms.

INVENTOR.
RICHARD W. HATCH, JR.

BY
Lawrence H. Poeton

AGENT

RATIOED PNEUMATIC REPEATER

This invention relates to pneumatic repeaters, and has particular reference to repeaters exemplified in the Richard W. Hatch, Jr., et al. Pat. No. 3,417,773.

This invention provides a ratioing repeater, using the structure and showing of the Hatch patent as an illustrative foundation and combination to set forth the disclosure of this invention, that is, a double diaphragm pressure repeater with ratio effect.

As an example of the important uses of the ratio repeater according to this invention, it may be used in pressure measurement of liquids in tanks, for example, in the head box of a paper machine. Such applications, in modern industry, require highly sensitive measurements, and amplification of the order of ten is readily accomplished by this invention. It is not limited to 10 to 1 ratio, since higher or lower ratios may be structured according to need or application.

All the advantages of the structure of the Hatch patent are retained, and in addition, the concepts and structure of a ratioing repeater are provided by this invention.

The ratio repeater of this invention is simple and effective. It comprises a pressure capsule with a relatively large diaphragm and a relatively small diaphragm. These diaphragms are mechanically rigidly connected, and are dividing walls establishing an outside chamber for input pressure, an outside chamber for output pressure, and an inside chamber between the diaphragms for bias pressure when desired.

These and other advantages of this invention will be in part apparent from the specification below and in part from the claims taken in conjunction with the drawings in which:

Figure 1:
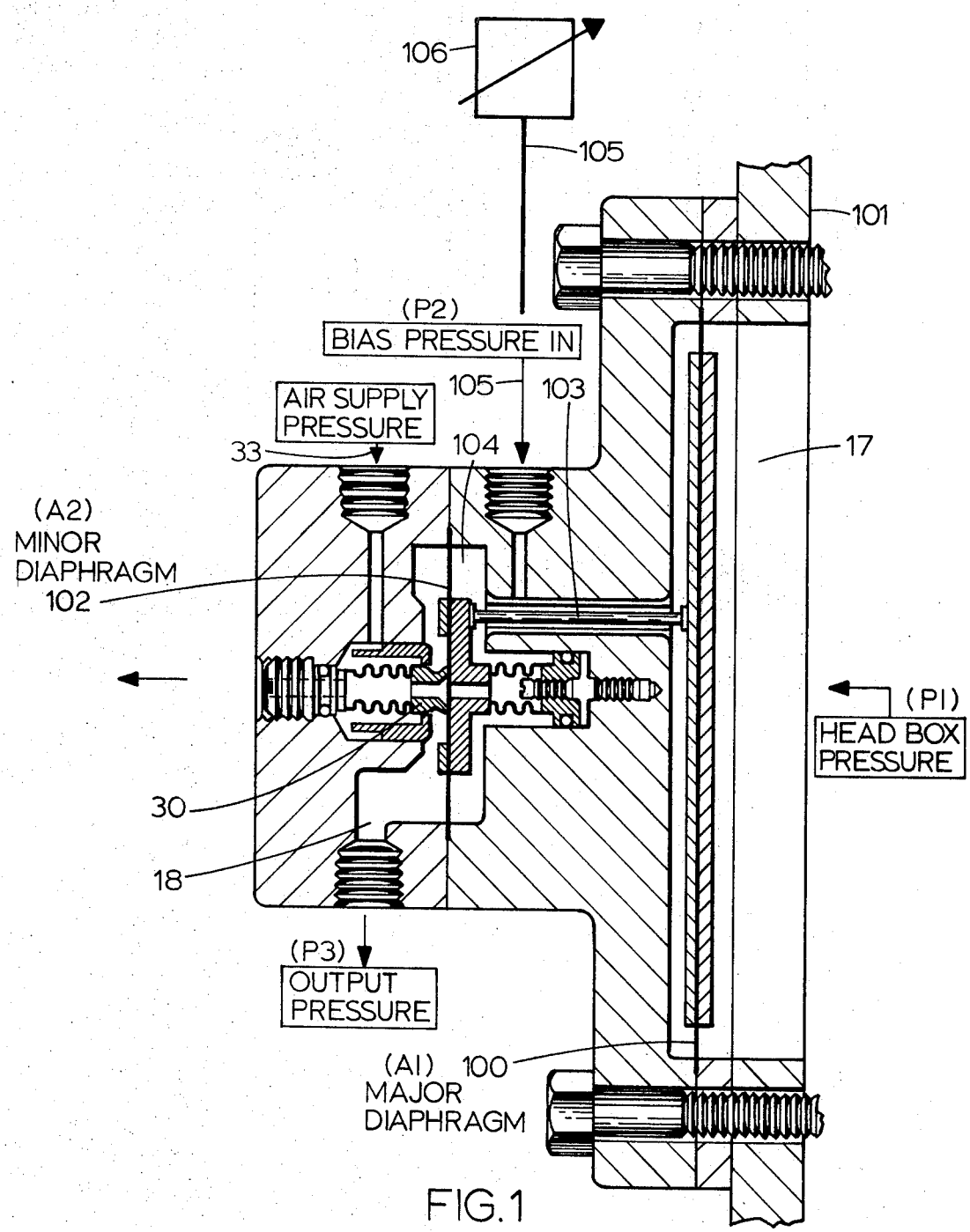
FIG. 1 is a half-sectioned view of a ratio repeater according to this invention.

As in FIG. 1, the ratio repeater of this invention is essentially a double diaphragm capsule, with, for example, the effective diaphragm areas in a 10 to 1 ratio. The major diaphragm 100 is the signal receiving diaphragm, mounted, for example, in an opening in the sidewall 101 of a tank such as the head box of a paper machine. Thus, a pressure measurement of liquid level is provided. The minor diaphragm 102 is connected to the major diaphragm 100 by a group of rigid standoff bars 103, ordinarily three, equally spaced around a circle line concentric to both diaphragms.

A bias pressure chamber 104 is formed between the diaphragms 100 and 102, with a bias pressure inlet 105 to the bias chamber 104.

This ratio structure is, by way of example of application, combined with the pneumatic repeater structure of the Hatch patent referred to previously herein.

The structure used to illustrate this invention herein is, in simple concept, the structure of the Hatch patent, with a double diaphragm capsule, with a chamber between the diaphragms and an input to this chamber; this capsule taking the place of the Hatch single diaphragm.

Figure 4:
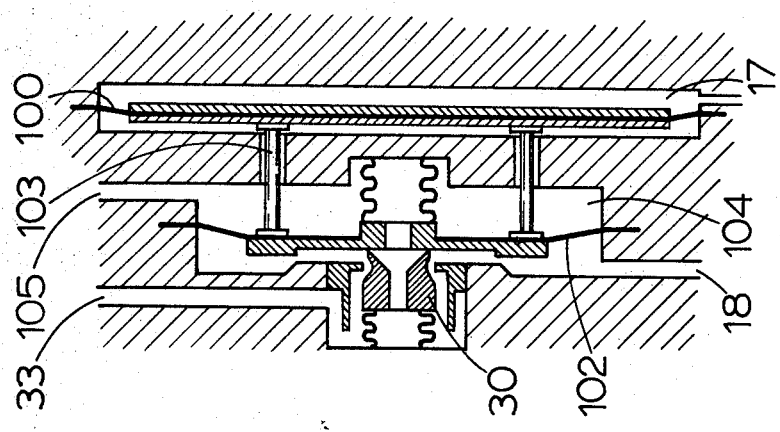
FIG. 4 is a schematic of the structure of FIG. 1 for the condition of relatively high input signal pressure.
Figure 3:
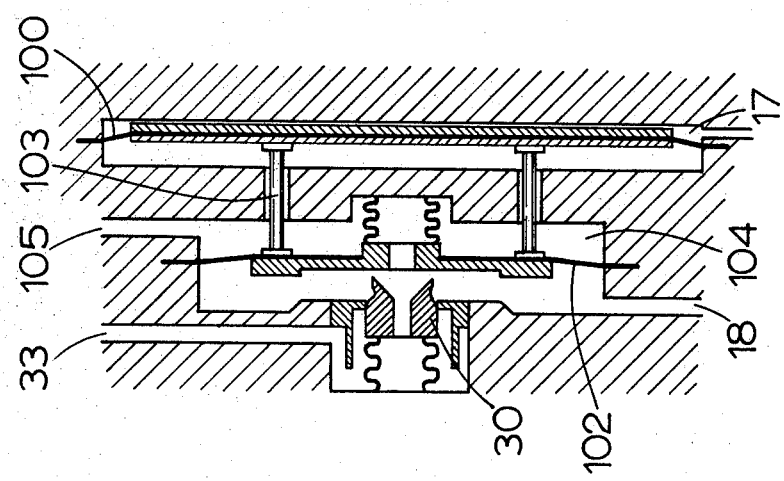
FIG. 3 is a schematic of the structure of FIG. 1 for the condition of relatively low input signal pressure.
Figure 2:
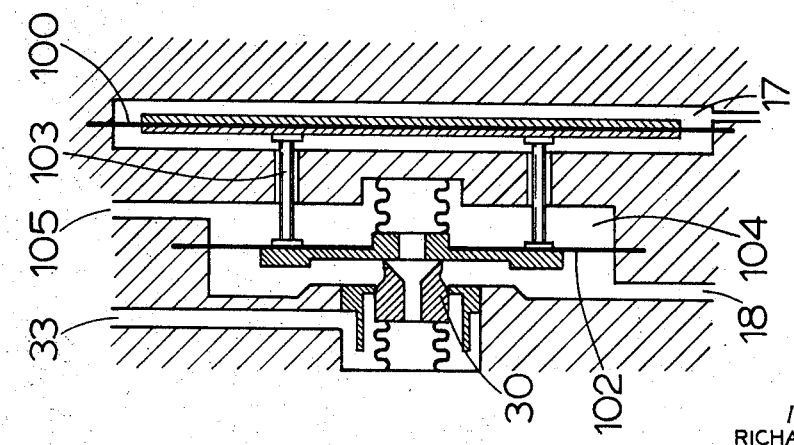
FIG. 2 is a schematic of the structure of FIG. 1 in static operating condition.

As illustrated in FIGS. 2, 3, and 4, and in like action to that of the Hatch patent, the double diaphragm capsule of this invention with the addition of its ratioing and bias function and structure, acts in much the same way as does the single diaphragm of the Hatch structure. That is, in FIG. 2 of the present disclosure, the device is balanced, with pressure in the output chamber 18 ten times that in the input chamber 17. The pressure in the intermediate chamber 104, in this instance, may be selected setpoint pressure. When, as in FIG. 3 the effect of the input pressure in the chamber 17 is less than that of the pressure in the output chamber 18, the double diaphragm capsule is moved away from the valve unit 30, and the output pressure is vented down until it's effect again balances the input pressure effect and the device again positions itself as in FIG. 2.

In FIG. 3, the opposite action is shown. In this case the input signal in chamber 17 has greater effect than the output signal in chamber 18, and the diaphragm capsule is moved against the valve unit 30, opening a connection between the output supply 33 and the output chamber 18. Thus, the pressure in the output chamber 18 builds up until its effect again brings about the situation of FIG. 2.

In FIG. 1, a bias pressure system is shown, for applying pressure between the diaphragms, that is, in the intermediate chamber 104.

As one example, bias pressure may be provided from a separate source 106, such as a set point supply. This may be any desired static signal pressure, or, as indicated, this supply may be variable, such as the output of some other instrumentation unit or system, in cascade or otherwise.

Accordingly, the device of this invention can be established as a diaphragm capsule structure, with two diaphragms of different sizes, to which two separate input signals may be applied, one to the usual input chamber outside of one of the diaphragms, and one to the chamber intermediate the diaphragms, to produce various combined effects on the output pressure, according to need or application.

The 10 to 1 ratio may be changed to any desired ratio by substituting diaphragms of different sizes for the 10 to 1 diaphragms.

The operation of the ratioed system according to this invention is further described as follows:

In the 10 to 1 operation of this device, the system equation is as follows:

$$P_3 = P_2 + 10 (P_1 - P_2)$$

Where:
- $P_1$ = Head Box Pressure or Signal Pressure
- $P_2$ = Bias Pressure (a constant pressure, very close to the process control Pressure)
- $P_3$ = Output Pressure

FORCE ANALYSIS

1. $P_1 a_1 + P_2 a_2 - P_2 a_1 - P_3 a_2 = 0$

Where: $a_1$ = area of major diaphragm
$a_2$ = area of minor diaphragm 2. and $a_1 = 10\, a_2$; this area ratio can be changed to give any multiplication agreeable to efficient control.

∴ since $a_1 = 10\, a_2$ then:

3. $10 P_1 a_2 + P_2 a_2 - 10 P_2 - P_3 a_2 = 0$ divide by $a_2$, then, $10 P_1 + P_2 - 10 P_2 - P_3 = 0$ and, $P_3 = P_2 + 10 P_1 - 10 P_2$

∴ 4. $P_3 = P_2 + 10 (P_1 - P_2)$

This invention therefor provides a new and useful pressure transducer as a ratioed repeater, with a double diaphragm capsule with two pressure inputs, one in between the diaphragms.

As many embodiments may be made of the above invention, and as changes may be made in the embodiments set forth above without departing from the scope of the invention, it is to be understood that all matter hereinbefore set forth or shown in the accompanying drawings is to be interpreted as illustrative only and not in a limiting sense.

I claim:

1. A ratioed pressure repeater system for producing an output pressure in a selected ratio to pressure in a head box:

said system comprising a head box, a relatively large opening in the wall of said head box, a pressure housing, an input recess in one side of said housing in matching size with said head box wall opening, means securing said pressure housing to said head box wall with said input recess overlying said head box wall opening in continuance thereof;

a diaphragm in said input recess and dividing said input recess into an outer input chamber and an inner input chamber;

a smaller recess in the body of said housing, a smaller diaphragm in said smaller recess and dividing said smaller recess into an inner chamber and an outer, output chamber;

a group of passages through said housing body, between said smaller recess inner chamber and said inner input chamber;

a rigid connector bar extending through each of said passages of said group and secured to both of said diaphragms;

a bias input pressure connection passage from the exterior of said housing to one of said pressure connection passages between said smaller recess inner chamber and said inner input chamber;

a source of bias input pressure external to said repeater system;

a pressure connection from said external source of bias input pressure to said bias input pressure connection passage;

a valving combination disposed proximate the side of said small diaphragm in said second outer chamber with said valving combination including means for venting said second outer chamber to atmosphere when the condition of differential pressure of said diaphragms is such as to move said small diaphragm away from said valving combination with the opening therebetween communicating said second outer chamber to said means for venting said second output chamber to atmosphere and said valving combination including means for providing access for a supply pressure into said second outer chamber when the condition of differential pressure of said diaphragms is such as to move said small diaphragm toward and against said valving combination thereby opening said access.

2. A pneumatic repeater for translating a pneumatic signal pressure into an output pressure in predetermined ratio to said signal pressure into an equivalent output pressure having the capability of supplying a load, comprising:

a housing having a recess therein divided by a movable diaphragm unit into an input pressure chamber and an output pressure chamber;

said diaphragm unit comprising a relatively large diaphragm in said input pressure chamber defining internal and external chambers therein, a relatively small diaphragm in said output pressure chamber defining internal and external chambers therein, pressure connection openings in said housing between said input pressure chamber and said output pressure chamber, rigid connector bars in said connection openings rigidly joining said diaphragms, and a bias pressure input connection to at least one of said connection openings between said diaphragms, from a source external to said repeater;

means for furnishing an input signal pressure to said external input chamber;

means for furnishing an output signal pressure from said external output chamber;

a valving combination disposed proximate the external side of said small diaphragm, with said valving combination including means for venting to atmosphere the said external output pressure chamber when the condition of differential pressure of said diaphragms is such as to move said small diaphragm away from said valving combination, with the opening therebetween communicating said external output pressure chamber to said means for venting said external output pressure chamber to atmosphere, and said valving combination including means for providing access for a supply pressure into said external output pressure chamber when the condition of differential pressure of said diaphragms is such as to move said small diaphragm toward and against said valving combination thereby opening said access.